(12) United States Patent
Hayase et al.

(10) Patent No.: US 11,920,674 B2
(45) Date of Patent: Mar. 5, 2024

(54) SHIFT DEVICE

(71) Applicant: KABUSHIKI KAISHA TOKAI-RIKA-DENKI-SEISAKUSHO, Aichi (JP)

(72) Inventors: Tomonori Hayase, Aichi-ken (JP); Koji Imai, Aichi-ken (JP); Tomoaki Asai, Aichi-ken (JP); Kota Nishida, Aichi-ken (JP); Yohei Nakano, Aichi-ken (JP); Yosuke Murakami, Aichi-ken (JP); Munetoshi Makimura, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 17/698,395

(22) Filed: Mar. 18, 2022

(65) Prior Publication Data
US 2022/0307590 A1  Sep. 29, 2022

(30) Foreign Application Priority Data
Mar. 25, 2021  (JP) .................. 2021-051946

(51) Int. Cl.
*F16H 59/10*  (2006.01)

(52) U.S. Cl.
CPC .................. *F16H 59/105* (2013.01)

(58) Field of Classification Search
CPC ............... F16H 59/105; F16H 59/0278; F16H 2059/0291; F16H 61/16; F16H 61/24; F16H 2061/243; F16H 2061/247
See application file for complete search history.

(56) References Cited

U.S. PATENT DOCUMENTS

| | | | | |
|---|---|---|---|---|
| 10,557,549 | B2 * | 2/2020 | Watanabe | F16H 59/08 |
| 10,830,339 | B2 * | 11/2020 | Watanabe | B60K 20/06 |
| 10,920,880 | B2 * | 2/2021 | Cha | F16H 59/10 |
| 10,941,859 | B2 * | 3/2021 | Watanabe | F16H 61/22 |
| 11,054,022 | B2 * | 7/2021 | Watanabe | F16H 61/22 |
| 11,364,798 | B2 * | 6/2022 | Watanabe | B60K 20/02 |
| 2020/0325982 | A1 * | 10/2020 | Watanabe | F16H 59/08 |
| 2021/0364082 | A1 | 11/2021 | Makimura | |

FOREIGN PATENT DOCUMENTS

| | | | |
|---|---|---|---|
| JP | 2014-156153 A | | 8/2014 |
| JP | 2014156153 A | * | 8/2014 |
| JP | 2021-183470 A | | 12/2021 |

* cited by examiner

*Primary Examiner* — Gregory Robert Weber
(74) *Attorney, Agent, or Firm* — Thomas W. Cole; Calderon Safran & Cole P.C.

(57) ABSTRACT

In this shift device, in a case in which an external force has acted on a lever when an operating mechanism is causing the lever to pivot, a clutch mechanism permits rotation of a first detent plate with respect to a second detent plate, such that pivoting of the lever is permitted. Note that a restraining mechanism urges the lever toward a shift position. This enables to the restraining mechanism to urge the lever separately to the clutch mechanism, thereby enabling the degrees of freedom for setting a biasing load on the lever by the restraining mechanism to be increased.

10 Claims, 14 Drawing Sheets

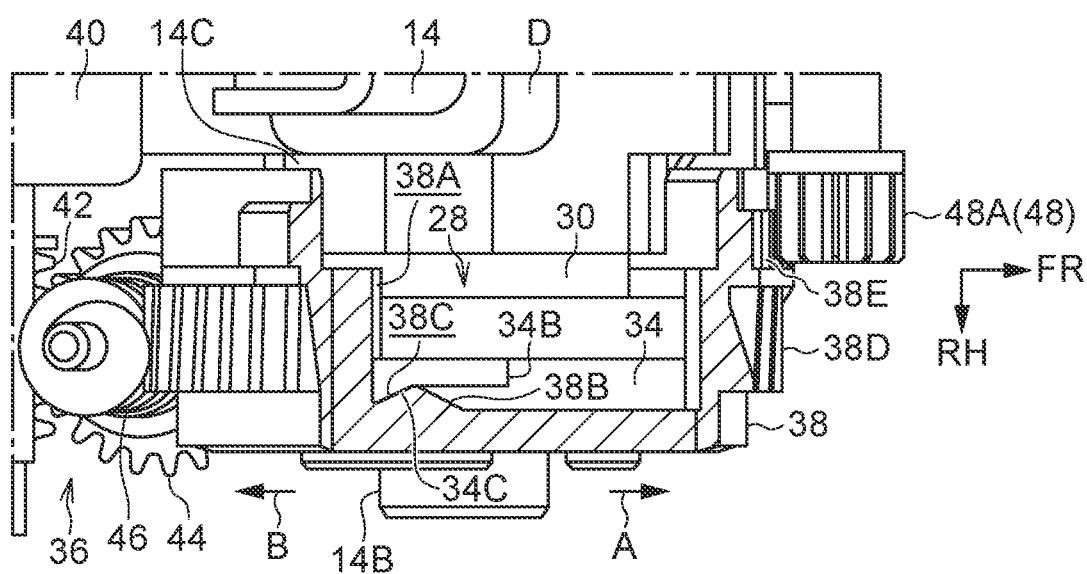

SHIFT DEVICE

CROSS-REFERENCE TO RELATED APPLICATION

This application is based on and claims priority under 35 USC 119 from Japanese Patent Application No. 2021-51946 filed on Mar. 25, 2021, the disclosure of which is incorporated by reference herein.

BACKGROUND

Technical Field

The present invention relates to a shift device in which a shift body is moved to change a shift position.

Related Art

In a shift lever device disclosed in Japanese Patent Application Laid-Open (JP-A) No. 2014-156153, an engagement projection of a clutch is fitted into an engagement recess in a worm wheel gear by urging force of a coil spring so as to connect a shift lever to a motor, such that the shift lever is pivoted through the worm wheel gear and the clutch when the motor is driven. If an external force acts on the shift lever while the motor is being driven, the engagement projection of the clutch moves out of the engagement recess in the worm wheel gear against the urging force of the coil spring, such that the connection of the shift lever to the motor is released.

Note that in this shift lever device, the engagement projection of the clutch is inserted into the engagement recess in the worm wheel gear by the urging force of the coil spring, and the shift lever is urged toward a shift position by this urging force.

SUMMARY

In consideration of the above circumstances, an object of the present invention is to obtain a shift device that is capable of increasing the degrees of freedom for setting urging load on a shift body by an urging mechanism.

A shift device of a first aspect of the present invention includes a shift body that is moved to change a shift position; an urging mechanism configured to urge the shift body toward a shift position; an operating mechanism that is capable of being operated; and a connecting mechanism including a first connecting section provided at a shift body side of the connecting mechanism and a second connecting section provided at an operating mechanism side of the connecting mechanism, the connecting mechanism connecting the shift body to the operating mechanism upon operation of the operating mechanism such that the shift body is moved while the first connecting section and the second connecting section are moving as an integral unit, and the first connecting section and the second connecting section being moved relatively to one another due to an external force acting on the shift body in a case in which the operating mechanism is being operated such that connection of the shift body to the operating mechanism is released.

In the shift device of the first aspect of the present invention, the shift body is moved to change the shift position. The connecting mechanism includes the first connecting section at the shift body side and the second connecting section at the operating mechanism side. The connecting mechanism connects the shift body to the operating mechanism upon operation of the operating mechanism, such that the shift body is moved while the first connecting section and the second connecting section are moving as an integral unit. The first connecting section and the second connecting section are moved relatively to one another due to an external force acting on the shift body in a case in which the operating mechanism is being operated, such that the connection of the shift body to the operating mechanism by the connecting mechanism is released.

Note that the urging mechanism urges the shift body toward a shift position. This enables the urging mechanism to urge the shift body separately to the connecting mechanism, thereby enabling the degrees of freedom for setting the urging load on the shift body by the urging mechanism to be increased.

A shift device of a second aspect of the present invention is the shift device of the first aspect of the present invention, wherein movement of the shift body by an urging force of the urging mechanism is limited in a case in which the operating mechanism is being operated.

In the shift device of the second aspect of the present invention, the movement of the shift body in a case in which the operating mechanism is being operated is limited by the urging force of the urging mechanism. This enables a change in the movement speed of the shift body to be suppressed.

A shift device of a third aspect of the present invention is the shift device of the first aspect or the second aspect of the present invention, further including a rotating section provided at the urging mechanism and configured to be rotated so as to move the shift body.

In the shift device of the third aspect of the present invention, the rotating section of the urging mechanism is rotated so as to move the shift body. This enables the shift body to be moved smoothly.

A shift device of a fourth aspect of the present invention is the shift device of any one of the first aspect to the third aspect of the present invention, further including a detection device configured to detect connection of the shift body to the operating mechanism by the connecting mechanism, and to detect a release of connection of the shift body to the operating mechanism by the connecting mechanism; and a control device that, in a case in which the control device causes the operating mechanism to operate in a forward direction to move the shift body, causes the operating mechanism to operate in a reverse direction in a case in which the detection device has detected connection of the shift body to the operating mechanism by the connecting mechanism has been released, and causes the operating mechanism to operate in the forward direction in a case in which the detection device has detected connection of the shift body to the operating mechanism by the connecting mechanism.

In the shift device of the fourth aspect of the present invention, in a case in which the control device causes the operating mechanism to operate in the forward direction to move the shift body, the control device causes the operating mechanism to operate in the reverse direction in a case in which the detection device has detected the connection of the shift body to the operating mechanism by the connecting mechanism has been released, and the control device causes the operating mechanism to operate in the forward direction in a case in which the detection device has detected the connection of the shift body to the operating mechanism by the connecting mechanism. Thus, even in a case in which the connection of the shift body to the operating mechanism by the connecting mechanism has been released when the operating mechanism causes the shift body to move, the connecting mechanism can reconnect the shift body to the operating mechanism and the operating mechanism can cause the shift body to move at an early stage.

A shift device of a fifth aspect of the present invention is the shift device of the fourth aspect of the present invention, wherein in a case in which the detection device has detected connection of the shift body to the operating mechanism by the connecting mechanism and that the control device has caused the operating mechanism to operate in the forward direction, the control device is configured to cause the operating mechanism to operate in the reverse direction in a case in which the detection device subsequently detects that connection of the shift body to the operating mechanism by the connecting mechanism has been released, and to cause the operating mechanism to operate in the forward direction in a case in which the detection device subsequently detects connection of the shift body to the operating mechanism by the connecting mechanism.

In the shift device of the fifth aspect of the present invention, in a case in which the detection device has detected the connection of the shift body to the operating mechanism by the connecting mechanism and that the control device has caused the operating mechanism to operate in the forward direction, the control device causes the operating mechanism to operate in the reverse direction in a case in which the detection device subsequently detects the connection of the shift body to the operating mechanism by the connecting mechanism has been released, and the control device causes the operating mechanism to operate in the forward direction in a case in which the detection device subsequently detects the connection of the shift body to the operating mechanism by the connecting mechanism. Thus, when the connecting mechanism connects the shift body to the operating mechanism and the operating mechanism causes the shift body to move, even in a case in which movement of the shift body is impeded such that the connection of the shift body to the operating mechanism by the connecting mechanism is released, the connecting mechanism can reconnect the shift body to the operating mechanism, such that the operating mechanism can cause motive force to act on the shift body.

A shift device of a sixth aspect of the present invention is the shift device of any one of the first aspect to the fifth aspect of the present invention, further including a third connecting section provided at the connecting mechanism so as to connect to the operating mechanism; and a limited section provided at the third connecting section such that the operating mechanism limits relative movement of the limited section.

In the shift device of the sixth aspect of the present invention, the third connecting section of the connecting mechanism is connected to the operating mechanism. This enables the shift body and the operating mechanism to be connected.

Furthermore, the operating mechanism limits relative movement of the limited section of the third connecting section. Thus, the operating mechanism enables relative movement of the connecting mechanism to be limited, and also enables relative movement of the shift body to be limited.

A shift device of a seventh aspect of the present invention is the shift device of any one of the first aspect to the sixth aspect of the present invention, further including a limiting section provided at the operating mechanism and configured to limit relative movement of the connecting mechanism.

In the shift device of the seventh aspect of the present invention, the limiting section of the operating mechanism limits relative movement of the connecting mechanism. The operating mechanism thereby enables relative movement of the shift body to be limited.

BRIEF DESCRIPTION OF THE DRAWINGS

Exemplary embodiments of the present invention will be described in detail based on the following figures, wherein:

FIG. 8C is a plan view illustrating a state when the lever of the shift device according to the exemplary embodiment of the present invention has connected to the operating mechanism, as viewed from the upper side;

DETAILED DESCRIPTION

Figure 1:
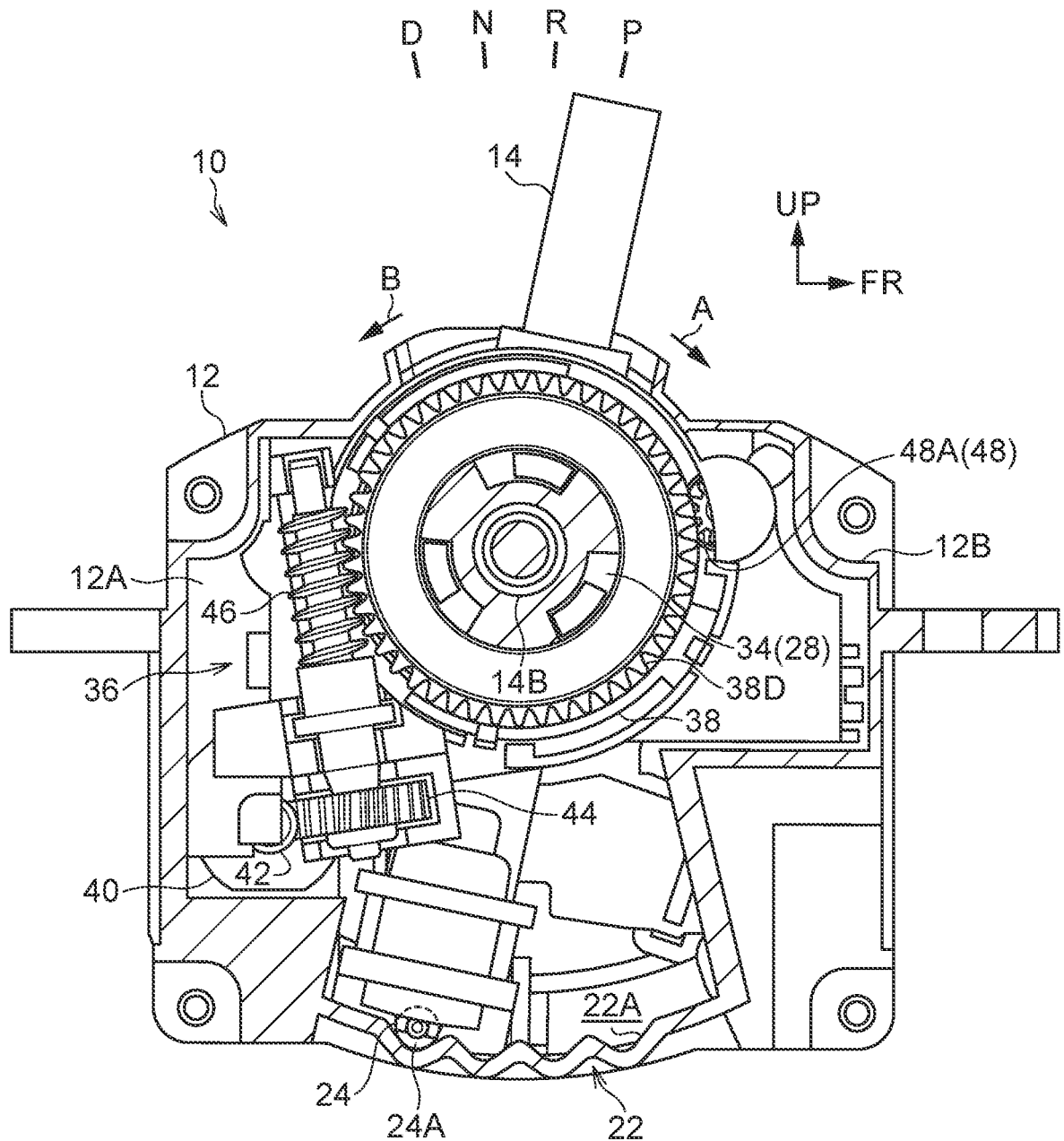
FIG. 1 is a side view illustrating a state in which a lever of a shift device according to an exemplary embodiment of the present invention is disposed at a "P" position, as viewed from the right.
Figure 4:
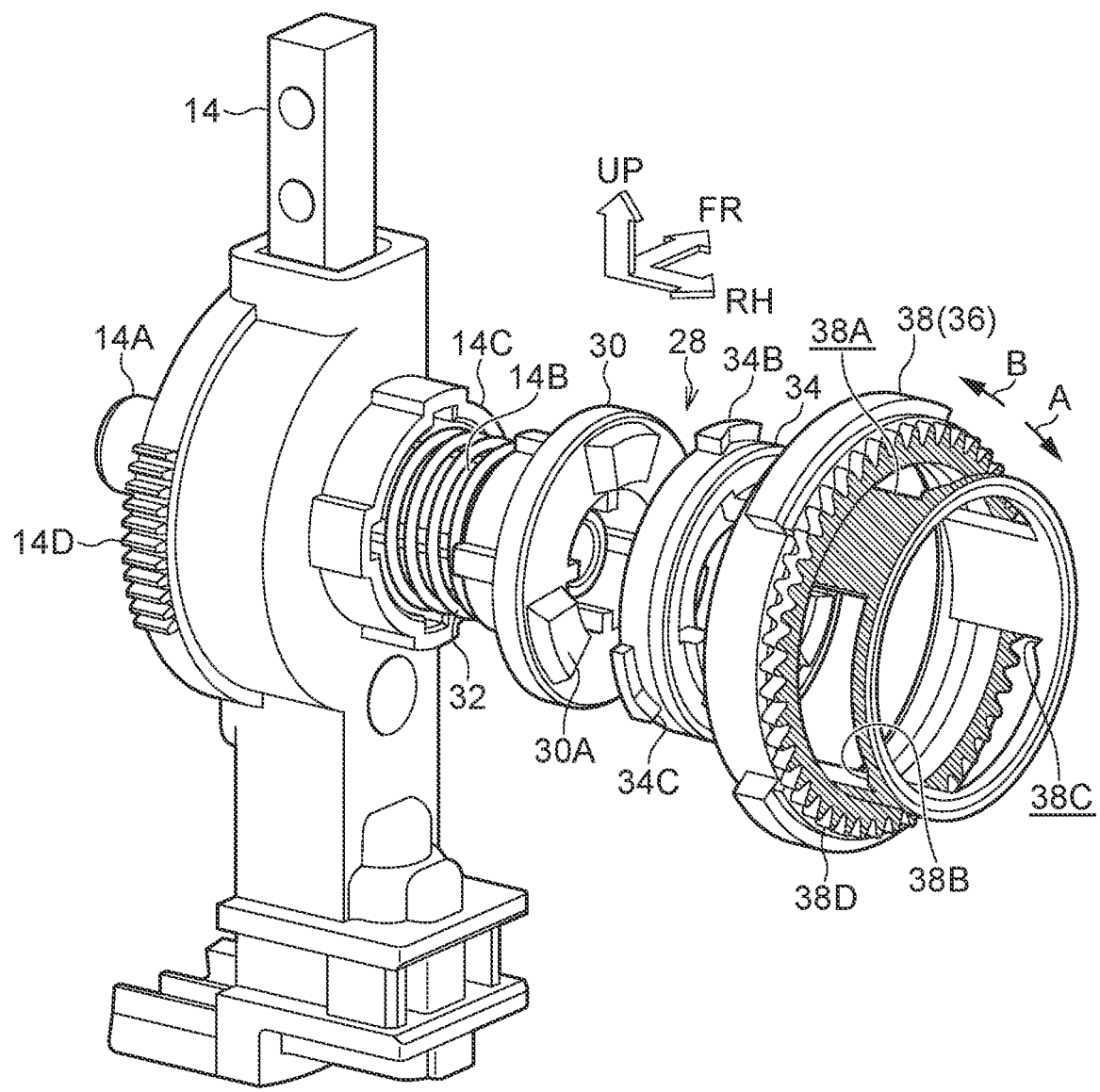
FIG. 4 is an exploded perspective view illustrating relevant portions of the shift device according to the exemplary embodiment of the present invention, as viewed obliquely from the rear-right.

FIG. 1 is a side view illustrating a shift device 10 according to an exemplary embodiment of the present invention as viewed from the right. FIG. 4 is an exploded perspective view illustrating relevant portions of the shift device 10 as viewed obliquely from the rear-right. Note that in the drawings, the arrow FR indicates a front side of the shift device 10, the arrow RH indicates a right side of the shift device 10, and the arrow UP indicates an upper side of the shift device 10.

The shift device 10 according to the present exemplary embodiment is installed to a console of a vehicle. The front, right, and upper sides of the shift device 10 respectively correspond to the front, right, and upper sides of the vehicle.

As illustrated in FIG. 1, a substantially rectangular box-shaped plate 12 is provided to the shift device 10. The plate 12 is fixed inside the console. A left plate 12A and a right plate 12B are respectively provided at the left side and the right side of the plate 12. The plate 12 is configured by assembling the left plate 12A and the right plate 12B.

As illustrated in FIG. 1 and FIG. 4, a substantially rod-shaped lever 14, serving as a shift body, is provided inside the plate 12. A substantially circular tube-shaped support shaft 14A and a similarly shaped support shaft 14B are integrally formed to the left side and the right side of an up-down direction intermediate portion of the lever 14. The support shaft 14A and the support shaft 14B respectively project toward the left and right, and are disposed coaxially to one another. The support shaft 14A and the support shaft 14B are respectively rotatably supported by a left wall and a right wall of the plate 12. The lever 14 is thereby capable of pivoting (moving) in a front-rear direction with the support shaft 14A and the support shaft 14B as central axes. Other than a right portion (leading end portion) thereof, an outer circumference of the support shaft 14B has an enlarged diameter.

Figure 2:
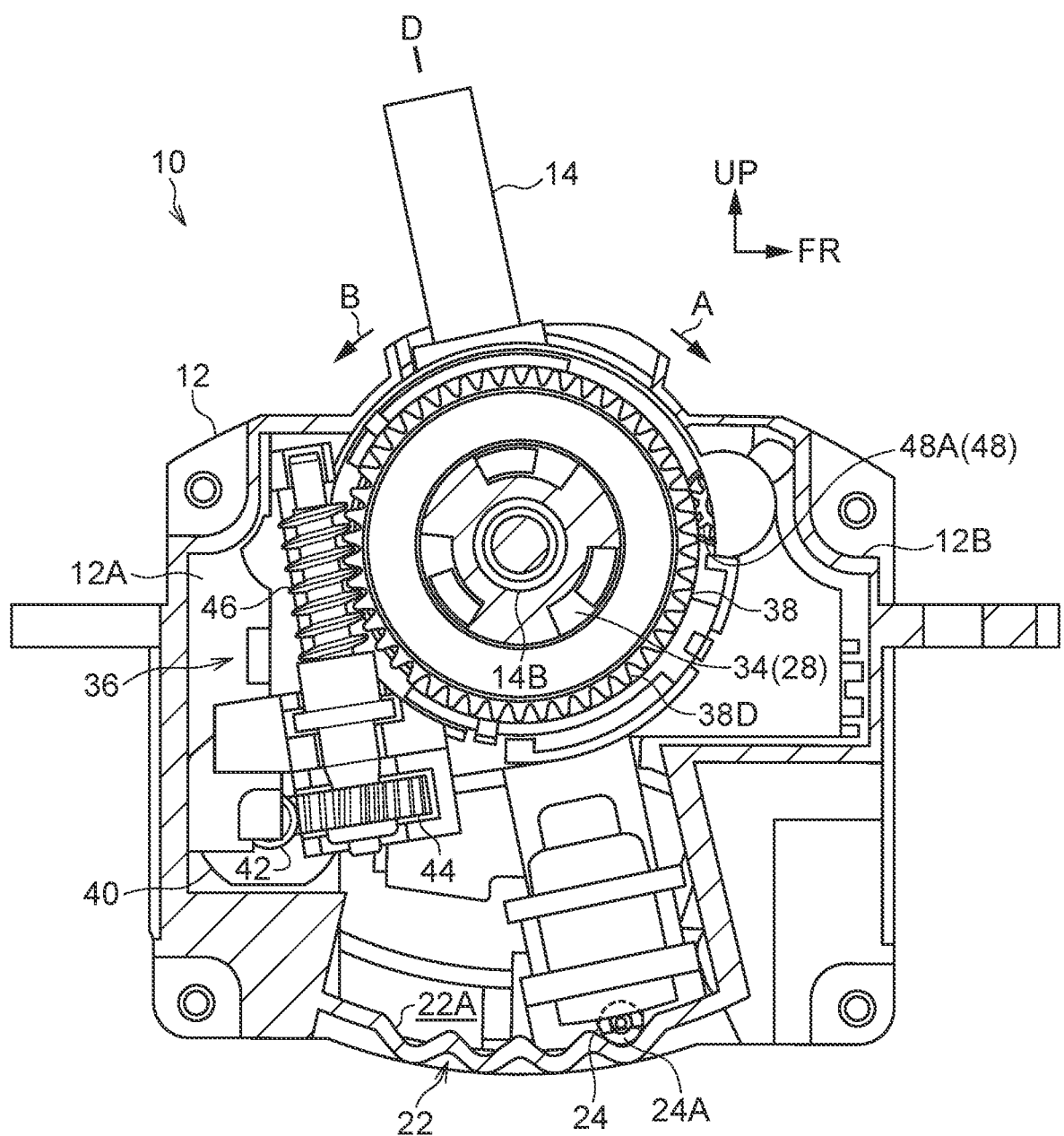
FIG. 2 is a side view illustrating a state in which the lever of the shift device according to the exemplary embodiment of the present invention is disposed at a "D" position, as viewed from the right.

A pivotable upper side portion of the lever 14 penetrates an upper wall of the plate 12 so as to project out at an upper side of the console (into the vehicle cabin) and to be capable of pivoting. The lever 14 is capable of being pivot-operated by an occupant (in particular a driver) of the vehicle in a state in which the occupant is gripping an upper end portion of the lever 14. When the lever 14 is pivot-operated from the front side to the rear side, shift positions of the lever 14 are changed in sequence from a "P" position (parking position; a predetermined position), to an "R" position (reverse position), an "N" position (neutral position), and a "D" position (drive position; see FIG. 2). The lever 14 is capable of pivoting over a range from the "P" position to the "D" position. When the lever 14 is pivot-operated between the front side and the rear side, the support shaft 14A and the support shaft 14B are both rotated in either one direction A or another direction B (see FIG. 1, etc.).

A substantially circular tube-shaped outer tube 14C is integrally formed to the right side of the up-down direction intermediate portion of the lever 14. The outer tube 14C projects toward the right, and is disposed coaxially to the support shaft 14B at a radial direction outside of a left portion (base end portion) of the support shaft 14B. A pivot gear 14D is formed at the rear side of the up-down direction intermediate portion of the lever 14. The pivot gear 14D is disposed at a radial direction outside of the outer tube 14C so as to follow a circumferential direction of the outer tube 14C.

Figure 3:
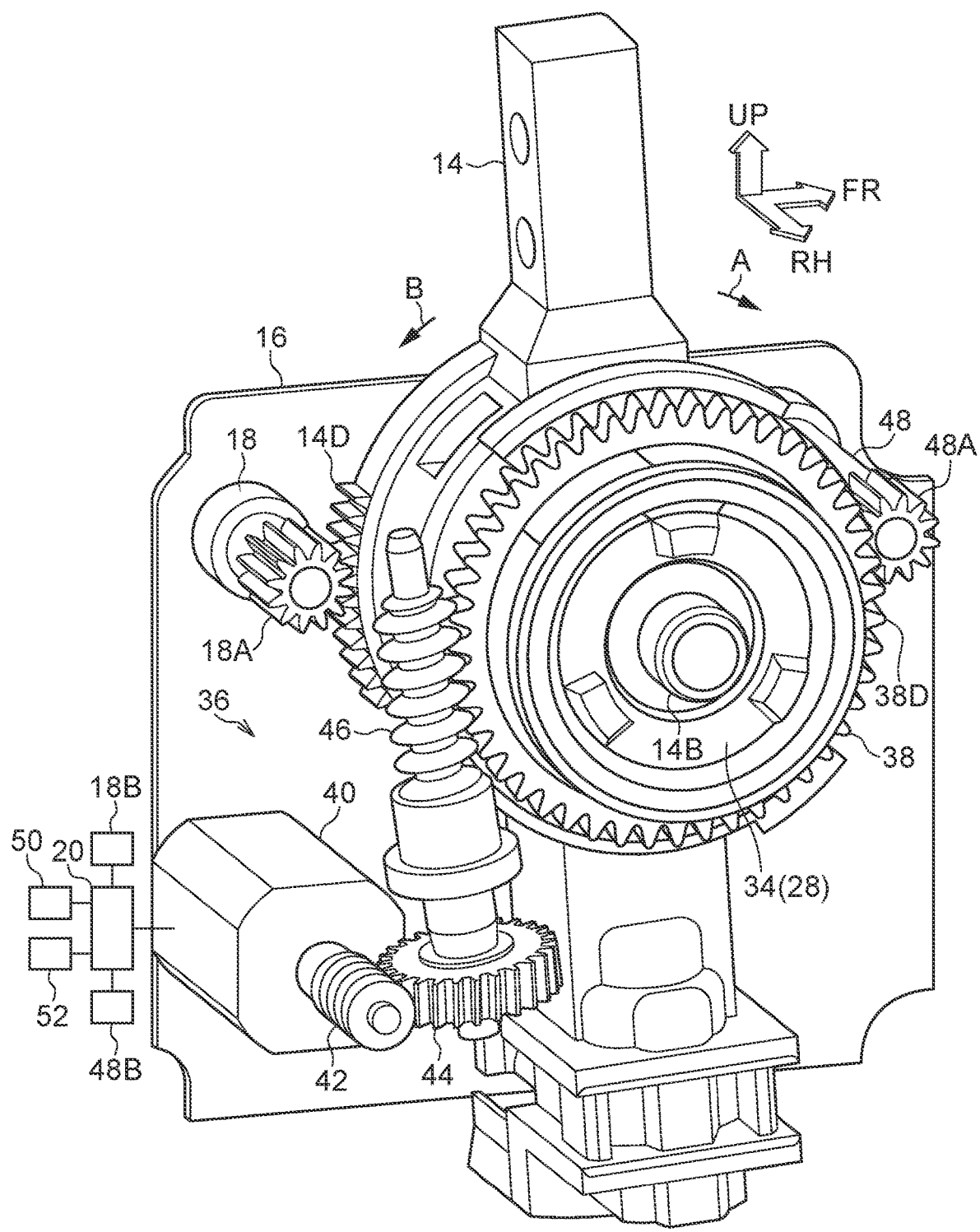
FIG. 3 is a perspective view illustrating the interior of the shift device according to the exemplary embodiment of the present invention, as viewed obliquely from the rear-right.

A circuit board 16 (see FIG. 3) is disposed at the left side of the lever 14. The circuit board 16 is fixed inside the plate 12. The circuit board 16 is disposed so as to be perpendicular to a left-right direction. The support shaft 14A of the lever 14 penetrates an upper portion of the circuit board 16 so as to be capable of rotating.

A shift detection device 18 (see FIG. 3), configuring a detection device, is provided at the rear side of the lever 14. A shift gear 18A is provided to the shift detection device 18. The shift gear 18A is rotatably supported inside the plate 12. The shift gear 18A is meshed with the pivot gear 14D of the lever 14, such that when the lever 14 is pivoted and the pivot gear 14D is also pivoted, the shift gear 18A is rotated. A magnet (not illustrated in the drawings) is fixed to a left end of the shift gear 18A. The magnet is rotated integrally with the shift gear 18A.

A shift sensor 18B opposes the left side of the shift gear 18A. The shift sensor 18B is provided to the circuit board 16. The shift sensor 18B detects a direction of a magnetic field generated by the magnet of the shift gear 18A so as to detect a rotation position of the shift gear 18A. A pivot position of the pivot gear 14D is thereby detected, and a pivot position and consequently the shift position of the lever 14 are detected in this manner. The shift sensor 18B is electrically connected to a control device 20 (CPU). The control device 20 is provided to the circuit board 16.

A restraining mechanism 22, serving as an urging mechanism, is provided at the lower side of the lever 14.

Figure 7:
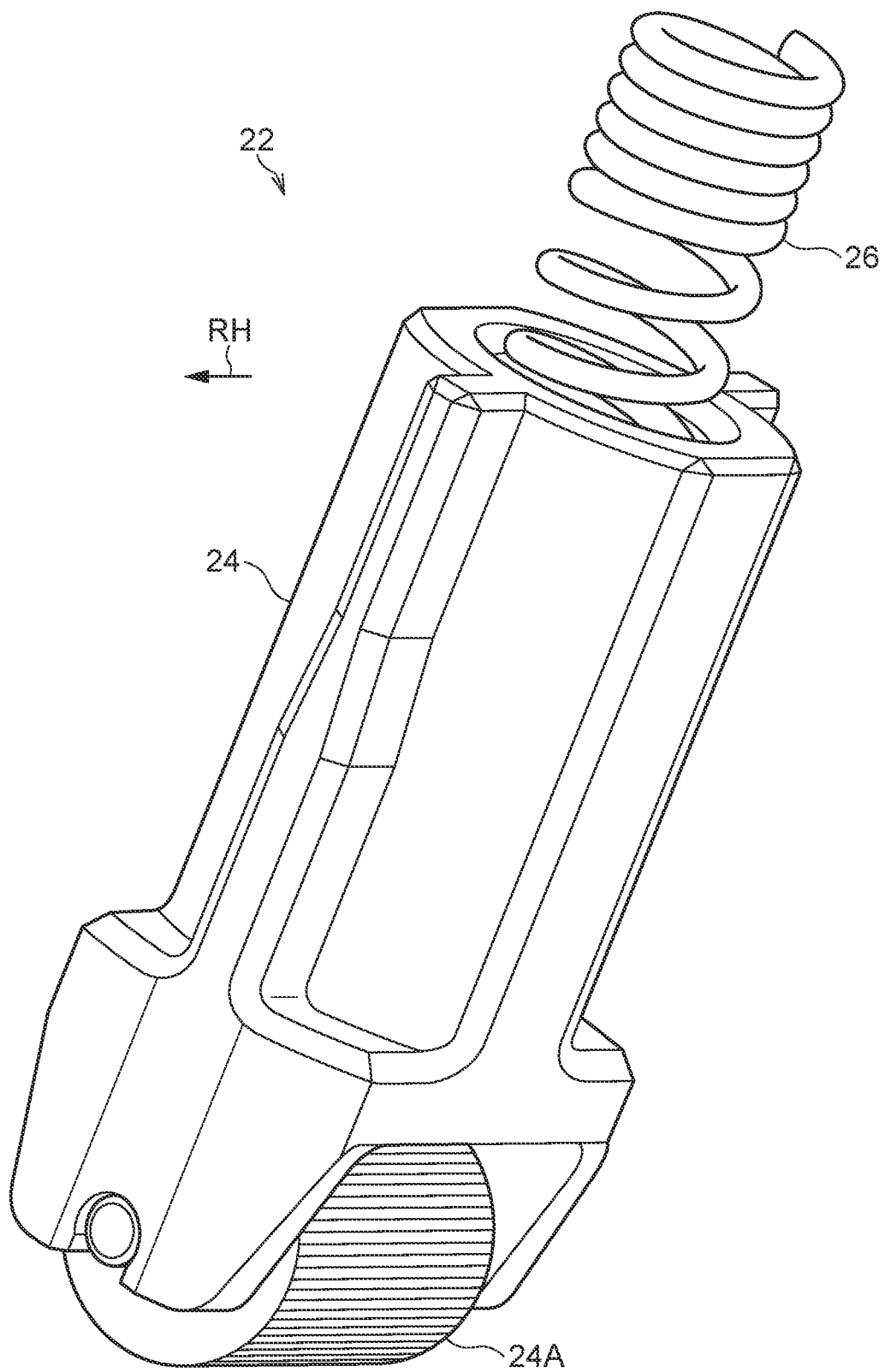
FIG. 7 is a perspective view illustrating a restraining body and so on of the shift device according to the exemplary embodiment of the present invention.

A substantially circular column-shaped restraining body 24 (see FIG. 7), serving as an urging body, is provided to the restraining mechanism 22. The restraining body 24 is inserted into a lower portion of the lever 14 from the lower side. The restraining body 24 is capable of pivoting integrally to the lever 14. The restraining body 24 is also capable of moving along a length direction of the lever 14, but is not capable of rotating about the length direction of the lever 14. A circular column-shaped roller 24A, serving as a rotating section, is rotatably supported by a lower portion of the restraining body 24. A rotation axial line of the roller 24A is disposed so as to be parallel to the left-right direction.

A restraining spring 26 (compression coil spring), serving as an urging member, is provided at the upper side of the restraining body 24 inside the lower portion of the lever 14. A lower portion of the restraining spring 26 is inserted into an upper portion of the restraining body 24. The restraining spring 26 spans between an upper face (bottom face) inside the lower portion of the lever 14 and a lower face (bottom face) inside the upper portion of the restraining body 24, such that the restraining spring 26 urges the restraining body 24 toward the lower side.

Plural (four in the present exemplary embodiment) restraining recesses 22A, serving as an urging section and each having a substantially triangular cross-section, are formed in a lower wall of the plate 12 (a lower wall of the right plate 12B). The plural restraining recesses 22A are arrayed about a pivot direction of the lever 14.

When the lever 14 is disposed at a given shift position, the roller 24A of the restraining body 24 is inserted into the corresponding restraining recess 22A of the plate 12 by the urging force of the restraining spring 26. Thus, the restraining body 24 is retained at its pivot position, and the lever 14 is retained at the given shift position (urged toward the given shift position).

Figure 5:
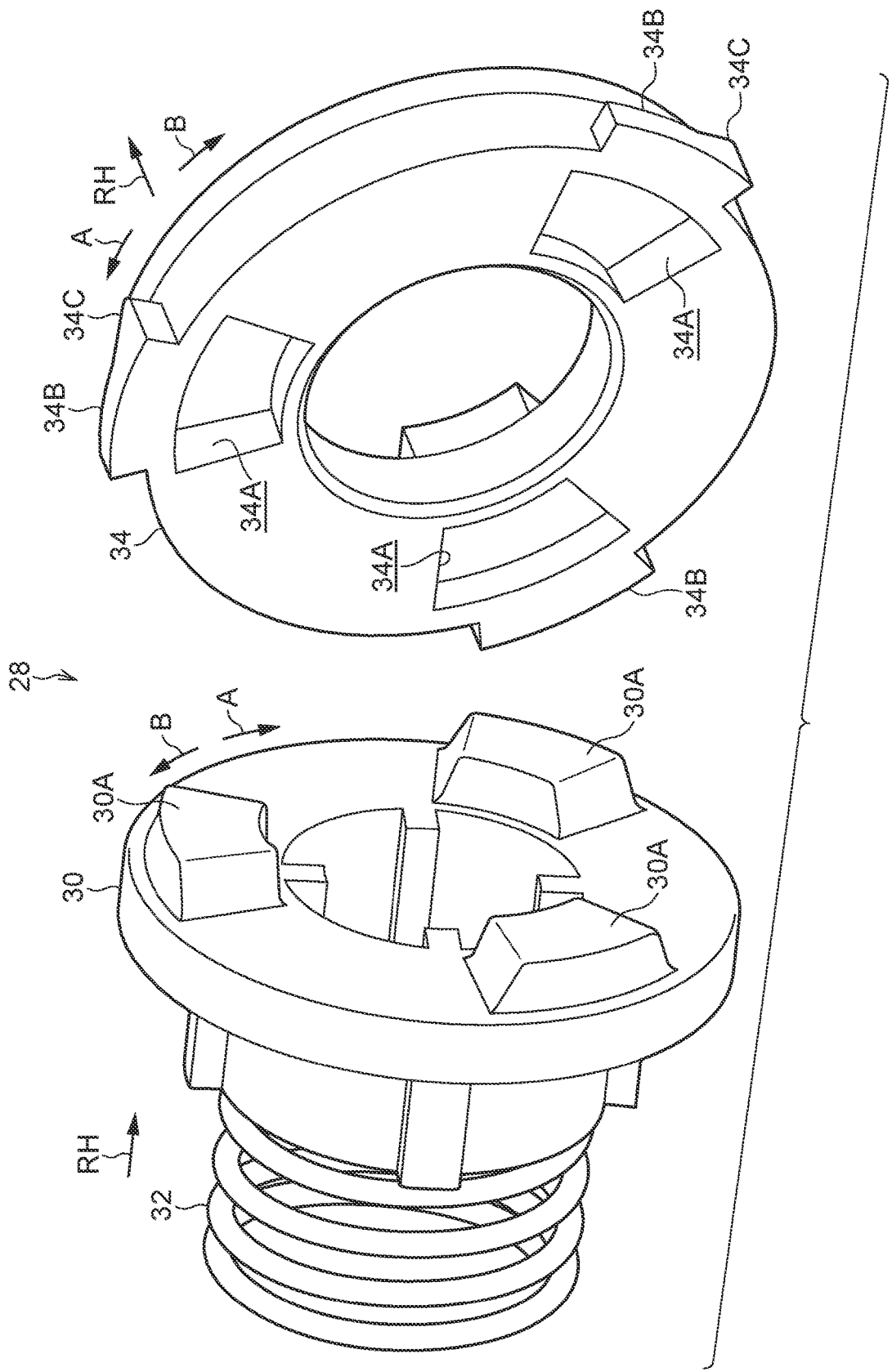
FIG. 5 is an exploded perspective view illustrating a clutch mechanism of the shift device according to the exemplary embodiment of the present invention.

A clutch mechanism 28 (see FIG. 5), serving as a connecting mechanism, is provided at the right side of the up-down direction intermediate portion of the lever 14.

A substantially circular tube-shaped first detent plate 30, serving as a first connecting member, is provided to the clutch mechanism 28. The support shaft 14B of the lever 14 is fitted into an inner portion of the first detent plate 30, and the first detent plate 30 is fitted into the outer tube 14C of the lever 14 so as to be coaxially supported by both the support shaft 14B and the outer tube 14C. A position of the first detent plate 30 in the lever 14-pivot direction with respect to the lever 14 is set at a specific position, such that the first detent plate 30 is capable of rotating (moving) integrally to the pivoting lever 14, and is also capable of moving in the left-right direction. An outer circumference of a right portion of the first detent plate 30 has an enlarged diameter.

Plural (three in the present exemplary embodiment) substantially rectangular bodied projections 30A, serving as a first connecting section, are integrally formed to a right face of the first detent plate 30. The plural projections 30A project toward the right side, and are arranged at uniform intervals around a circumferential direction of the first detent plate 30. Outside faces (radial direction outside faces of the first detent plate 30) and inside faces (radial direction inside faces of the first detent plate 30) of the respective projections 30A are disposed parallel to the left-right direction, and are curved following the circumferential direction of the first detent plate 30. One side faces (one direction A-side faces) and other side faces (other direction B-side faces) of the respective projections 30A are disposed parallel to the radial direction of the first detent plate 30, and are sloped toward the left side on progression toward the first detent plate 30-circumferential direction outside of the projections 30A.

A clutch spring 32 (compression coil spring), serving as a connection urging member, is provided at the left side of the first detent plate 30. The support shaft 14B of the lever 14 is inserted into an inner portion of the clutch spring 32, and the clutch spring 32 is inserted into the outer tube 14C of the lever 14. The clutch spring 32 spans between a left face inside the outer tube 14C (a right face of the lever 14) and a left face of the first detent plate 30, such that the clutch spring 32 urges the first detent plate 30 toward the right side.

A substantially circular ring plate-shaped second detent plate 34, serving as a second connecting member, is disposed at the right side of the first detent plate 30. The vicinity of the right portion of the support shaft 14B of the lever 14 is substantially fit into the second detent plate 34, such that the second detent plate 34 is capable of moving toward the left, whereas movement toward the right is restricted by the right wall of the plate 12.

Plural (three in the present exemplary embodiment) substantially rectangular bodied recesses 34A, serving as a second connecting section, are formed in a left face of the second detent plate 34. The plural recesses 34A are arranged at uniform intervals around a circumferential direction of the second detent plate 34. Outside faces (radial direction outside faces of the second detent plate 34) and inside faces (radial direction inside faces of the second detent plate 34) of the respective recesses 34A are disposed parallel to the left-right direction, and are curved following the circumferential direction of the second detent plate 34. One side faces (one direction A side faces) and other side faces (other direction B side faces) of the respective recesses 34A are disposed parallel to the radial direction of the second detent plate 34, and are sloped toward the left side on progression toward the second detent plate 34-circumferential direction outside of the recesses 34A.

Figure 9A:
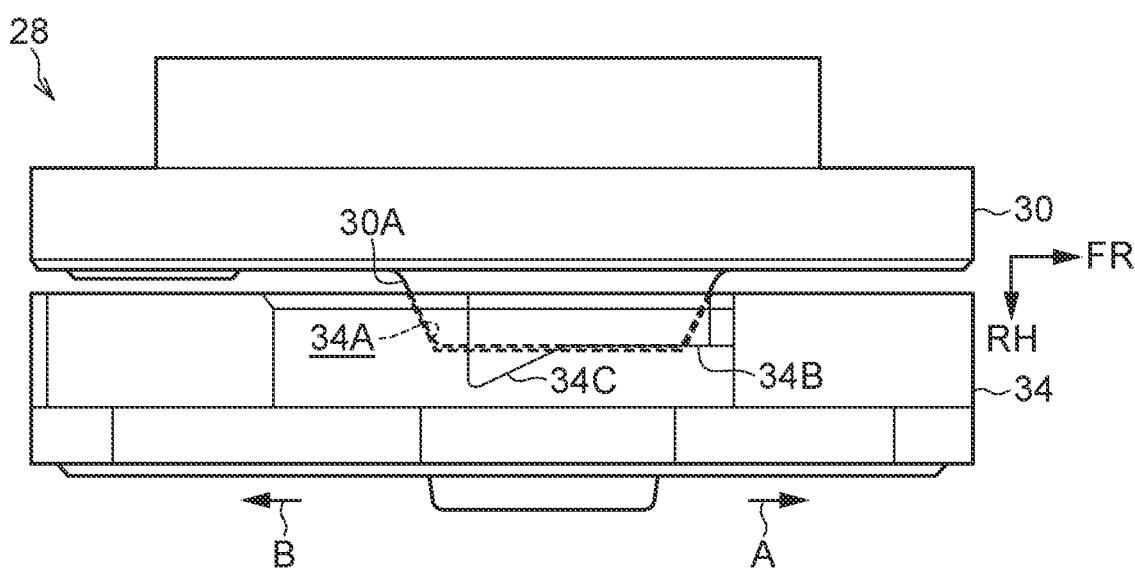
FIG. 9A is a plan view illustrating a state when the clutch mechanism of the shift device according to the exemplary embodiment of the present invention has connected the lever to the operating mechanism, as viewed from the upper side.

The projections 30A of the first detent plate 30 are inserted into the respective recesses 34A by the urging force of the clutch spring 32 (see FIG. 9A). The outside faces of the recesses 34A fit together with the outside faces of the respective projections 30A, such that the second detent plate 34 is supported by the first detent plate 30 in the radial direction, and is disposed coaxially to the first detent plate 30. The one side faces and the other side faces of the respective projections 30A abut (make line-contact with) one corners (corners between the one direction A side and the left side) and other corners (corners between the other direction B side and the left side) of the corresponding recesses 34A. Thus, the second detent plate 34 is capable of rotating (moving) integrally to the first detent plate 30, and is rotated integrally to the pivoting lever 14 and the rotating first detent plate 30.

Plural (three in the present exemplary embodiment) substantially elongated rectangular plate-shaped connecting tabs 34B, serving as a third connecting section, are integrally formed to an outer circumferential face of the second detent plate 34. The plural connecting tabs 34B are arranged at uniform intervals around the circumferential direction of the second detent plate 34. The connecting tabs 34B project toward the radial direction outside of the second detent plate 34. The connecting tabs 34B extend following the circumferential direction of the second detent plate 34 and are curved following the circumferential direction of the second detent plate 34. A substantially right-angled triangular plate-shaped limiting projection 34C, serving as a limited section, is integrally formed to an other direction B-side end portion of each of the connecting tabs 34B. The limiting projection 34C projects toward the right side. One side face (one direction A-side side face) of the limiting projection 34C is sloped toward the right on progression toward the other direction B, whereas an other side face (other direction B-side side face) of the limiting projection 34C configures an other side face (other direction B-side side face) of the corresponding connecting tab 34B.

An operating mechanism 36 (see FIG. 3) is provided at the rear side and right side of the lever 14.

Figure 6:
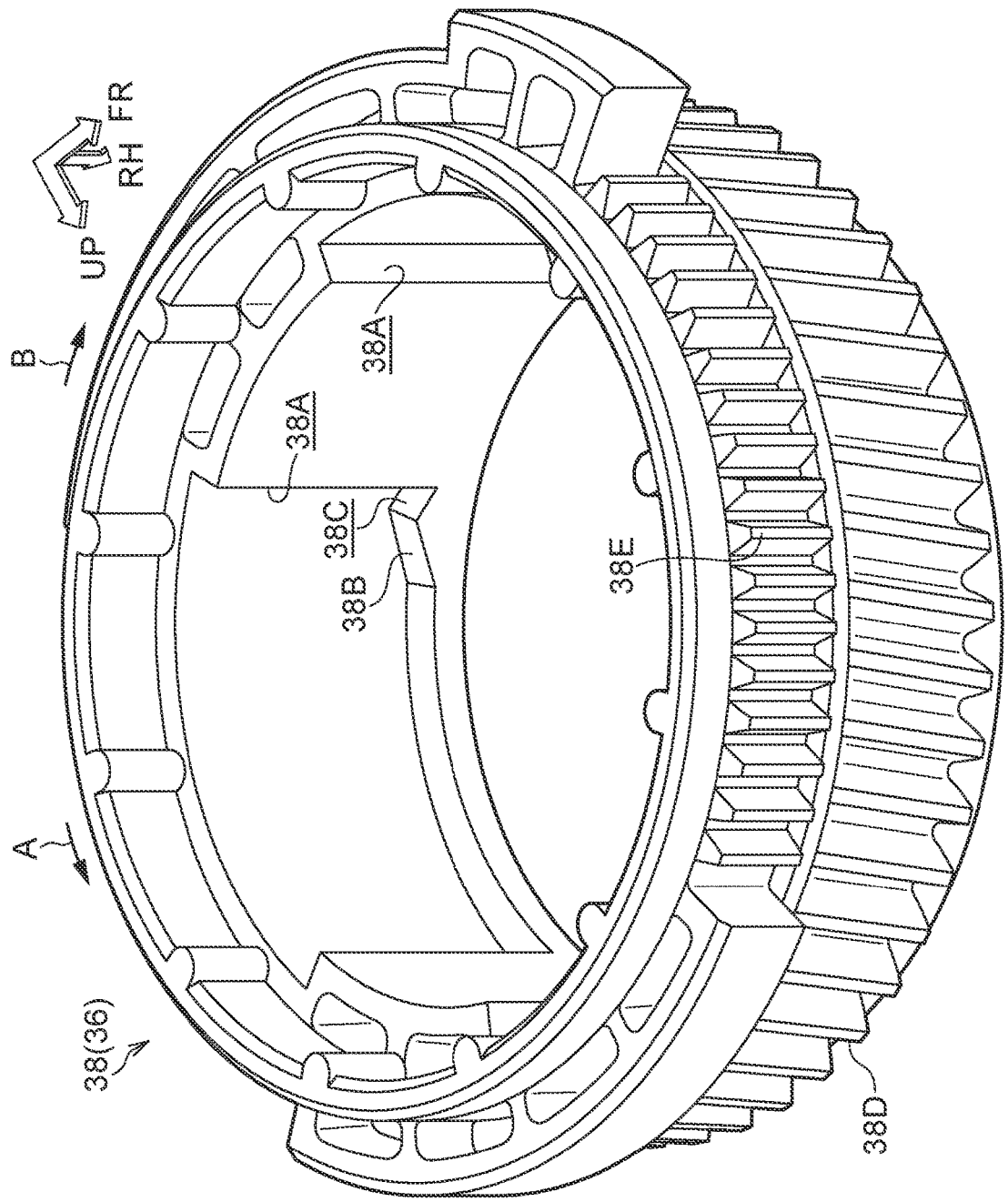
FIG. 6 is a perspective view illustrating a rotor cam of the shift device according to the exemplary embodiment of the present invention, as viewed obliquely from the front-left.

A substantially circular tube-shaped rotor cam 38 (see FIG. 6), serving as an operating member, is provided to the operating mechanism 36. The rotor cam 38 disposed coaxially to the radial direction outsides of the outer tube 14C of the lever 14, the first detent plate 30, and the second detent plate 34. The rotor cam 38 is rotatably supported inside the plate 12 in a state in which movement in the left-right direction (axial direction) is restricted.

Figure 8A:
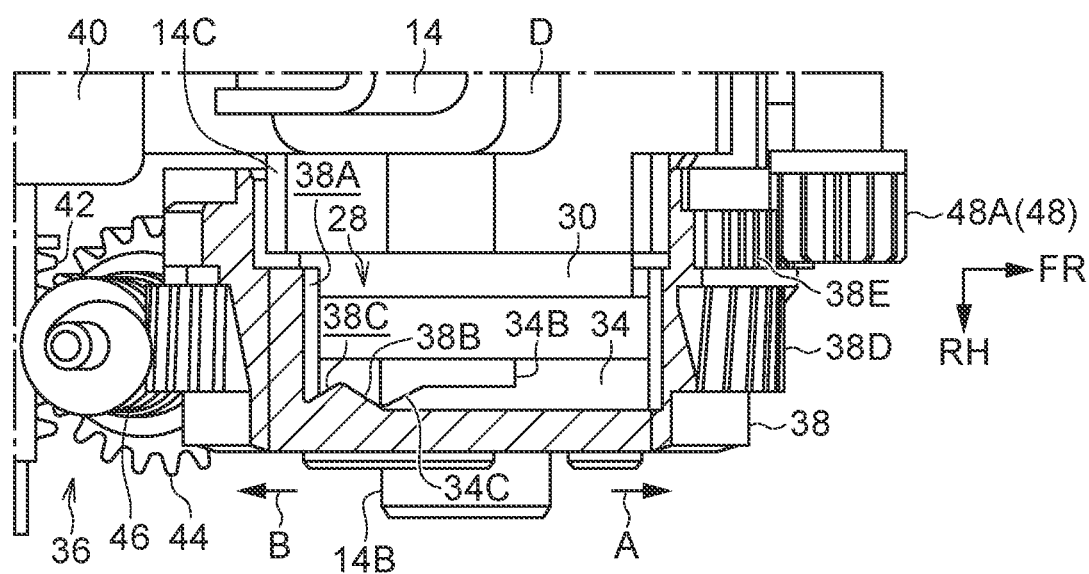
FIG. 8A is a plan view illustrating a state prior to a lever of the shift device according to the exemplary embodiment of the present invention connecting to an operating mechanism, as viewed from the upper side.

Plural (three in the present exemplary embodiment) substantially rectangular plate-shaped connecting holes 38A, serving as a connected section, are formed in a radial direction inside portion of the rotor cam 38. The plural connecting holes 38A are arranged at uniform intervals around a circumferential direction of the rotor cam 38. The connecting holes 38A extend following the circumferential direction of the rotor cam 38. The connecting holes 38A are open toward the left side and toward the radial direction inside of the rotor cam 38, and the connecting tabs 34B of the second detent plate 34 are inserted into right portions of the respective connecting holes 38A (see FIG. 8A). A substantially trapezoidal plate-shaped limiting protrusion 38B is formed at a corner between the other direction B side and the right side of each of the connecting holes 38A. The limiting protrusion 38B is curved following the circumferential direction of the rotor cam 38, and one side face (one direction A-side side face) of the limiting protrusion 38B is sloped toward the left on progression toward the other direction B. A limiting recess 38C, serving as a limiting section with a substantially right-angled triangular cross-section, is formed in a left portion of the limiting protrusion 38B. The limiting recess 38C is open toward the left side. One side face (one direction A-side side face) of the limiting recess 38C is sloped toward the right on progression toward the other direction B, whereas an other side face (other direction B-side side face) of the limiting recess 38C configures an other side face (other direction B-side side face) of the corresponding connecting hole 38A.

The rotor cam 38 is disposed at a reference rotation position (reference position). When the lever 14 is pivot-operated within a range from the "P" position to the "D" position, despite the second detent plate 34 being rotated integrally to the pivoting lever 14, the connecting tabs 34B of the second detent plate 34 remain disposed on the one direction A side of the corresponding limiting protrusions 38B of the rotor cam 38.

A worm wheel 38D is formed around the entire circumferential direction at a right side portion of the outer circumference of the rotor cam 38. A rotation gear 38E is formed at a front portion of a left side portion of the outer circumference of the rotor cam 38.

A motor 40, serving as a drive device, is provided to the operating mechanism 36. The motor 40 is fixed inside the plate 12 and a worm 42 is coaxially fixed to an output shaft of the motor 40. The motor 40 is electrically connected to the control device 20 on the circuit board 16. The motor 40 is driven (the operating mechanism 36 is operated) to rotate the worm 42 under the control of the control device 20.

A helical gear 44 (worm wheel) is meshed with the worm 42. The helical gear 44 is rotatably supported inside the plate 12. A worm gear 46 (worm) is coaxially fixed to the upper side of the helical gear 44. When the worm 42 is rotated, the helical gear 44 and the worm gear 46 are rotated integrally thereto.

The worm wheel 38D of the rotor cam 38 is meshed with the worm gear 46, such that when the worm gear 46 is rotated, the rotor cam 38 is also rotated. Note that since the worm gear 46 is not rotated by rotation of the rotor cam 38 (worm wheel 38D), the worm gear 46 is capable of restricting rotation of the rotor cam 38.

An operation detection device 48 (see FIG. 3), configuring a detection device, is provided at the front side of the rotor cam 38.

A rotor gear 48A is provided to the shift detection device 18. The rotor gear 48A is rotatably supported inside the plate 12. The rotor gear 48A is meshed with the rotation gear 38E of the rotor cam 38, such that when the rotor cam 38 is rotated and the rotation gear 38E is rotated accordingly, the rotor gear 48A is also rotated. A magnet (not illustrated in the drawings) is fixed to a left end of the rotor gear 48A. The magnet is rotated integrally to the rotor gear 48A.

An operation sensor 48B opposes the left side of the rotor gear 48A. The operation sensor 48B is provided on the circuit board 16. The operation sensor 48B detects a direction of a magnetic field generated by the magnet of the rotor gear 48A to detect a rotation position of the rotor gear 48A so as to detect a rotation position of the rotor cam 38. The operation sensor 48B is electrically connected to the control device 20 on the circuit board 16.

An automatic transmission 50 (transmission) of the vehicle is electrically connected to the control device 20. A vehicle entry/exit sensor 52 is also electrically connected to the control device 20. The vehicle entry/exit sensor 52 detects occupant entry and exit to and from the vehicle.

Next, explanation follows regarding operation of the present exemplary embodiment.

In the restraining mechanism 22 of the shift device 10 with the above configuration, when the lever 14 is pivoted to change the shift position of the lever 14, the roller 24A of the restraining body 24 moves out of one of the restraining recesses 22A in the plate 12 while the restraining body 24 are being moved toward the upper side against the urging force of the restraining spring 26. The roller 24A is then inserted into a restraining recess 22A adjacent to the one restraining recess 22A while the restraining body 24 is being moved toward the lower side by the urging force of the restraining spring 26. As a result, pivoting resistance force is followed by pivoting assistance force acting on the lever 14, such that an indexing sensation is conveyed in the pivot-operation of the lever 14.

Moreover, the projections 30A of the first detent plate 30 of the clutch mechanism 28 have been inserted into the recesses 34A in the second detent plate 34 by the urging force of the clutch spring 32, such that the first detent plate 30 and the second detent plate 34 are rotated as a single unit (rotated together) integrally to the pivoting lever 14.

When the lever 14 has been pivot-operated to change the shift position of the lever 14 (when the shift detection device 18 has detected a change in the shift position of the lever 14), a shift range of the automatic transmission 50 is changed to a shift range corresponding to the shift position of the lever 14 under the control of the control device 20.

Note that when the lever 14 has been placed at a position other than the "P" position (such as the "D" position; see FIG. 8A) (when the shift detection device 18 has detected the lever 14 has been placed at a position other than the "P" position), under predetermined circumstances (such as cases in which the vehicle entry/exit sensor 52 has detected the occupant has exited the vehicle), the shift range of the automatic transmission 50 is automatically changed to a "P" range (parking range) under the control of the control device 20.

Under these predetermined circumstances when the lever 14 has been placed at a position other than the "P" position, the motor 40 is driven forward under the control of the control device 20 such that the operating mechanism 36 is operated in a forward direction. The worm 42, the helical gear 44, and the worm gear 46 of the operating mechanism 36 are rotated as a result, such that the rotor cam 38 is rotated in the one direction A from the reference rotation position.

Figure 8B:
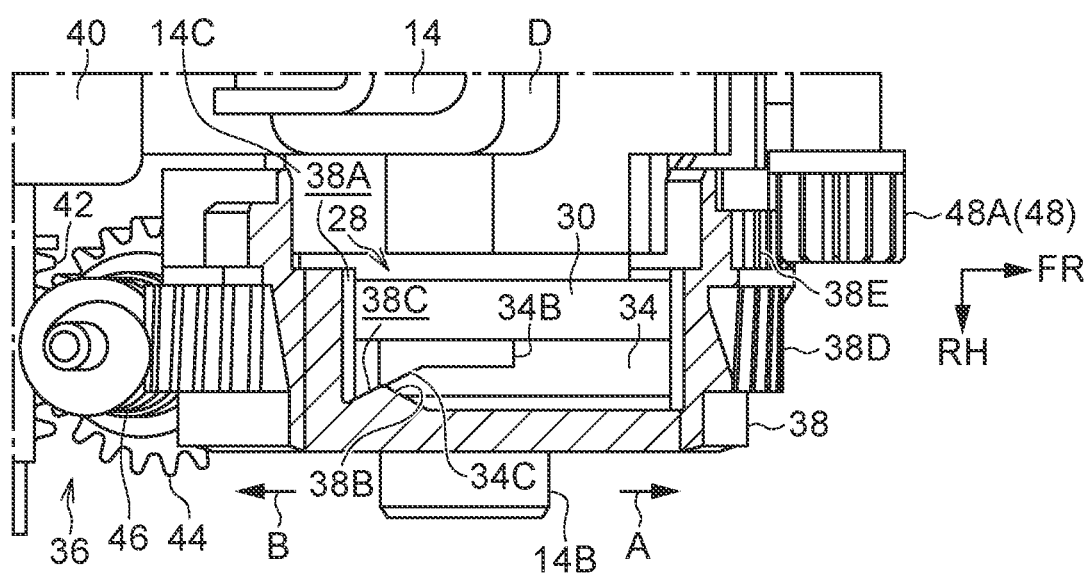
FIG. 8B is a plan view illustrating a state while the lever of the shift device according to the exemplary embodiment of the present invention is connecting to the operating mechanism, as viewed from the upper side.

Thus, in a state in which the lever 14 is being retained at its pivot position by the restraining mechanism 22 (urging force of the restraining spring 26), the one side faces of the limiting protrusions 38B of the rotor cam 38 slide with respect to the limiting projections 34C of the second detent plate 34 (connecting tabs 34B), such that the second detent plate 34 and the first detent plate 30 are moved toward the left side against the urging force of the clutch spring 32 (see FIG. 8B). When the one side faces of the limiting recesses 38C in the rotor cam 38 then slide further with respect to the one side faces of the limiting projections 34C, the second detent plate 34 and the first detent plate 30 are then moved toward the right side by the urging force of the clutch spring 32. Thus, the limiting projections 34C are fitted into the limiting recesses 38C, and the other side faces of the connecting holes 38A of the rotor cam 38 (including the other side faces of the limiting recesses 38C) abut the other side faces of the connecting tabs 34B (including the other side faces of the limiting projections 34C) (see FIG. 8C). The lever 14 is thereby connected to the rotor cam 38 by the clutch mechanism 28, such that when the second detent plate 34 and the first detent plate 30 are rotated in the one direction A by the rotor cam 38, the lever 14 is pivoted to the "P" position at the front side such that the shift position of the lever 14 corresponds to the shift range of the automatic transmission 50.

Moreover, when the lever 14 has been pivoted to the "P" position (when the shift detection device 18 has detected the lever 14 has been pivoted to the "P" position), the motor 40 is then driven in reverse under the control of the control device 20 to operate the operating mechanism 36 in a reverse direction. The worm 42, the helical gear 44, and the worm gear 46 are rotated as a result, such that the rotor cam 38 is rotated in the other direction B.

Thus, in a state in which the lever 14 is being retained at the "P" position by the restraining mechanism 22 (urging force of the restraining spring 26), the one side faces of the limiting recesses 38C in the rotor cam 38 slide with respect to the one side faces of the limiting projections 34C of the second detent plate 34, such that the second detent plate 34 and the first detent plate 30 are moved toward the left side against the urging force of the clutch spring 32, and the limiting projections 34C are moved out of the limiting recesses 38C (see FIG. 8B). When the one side faces of the limiting protrusions 38B of the rotor cam 38 then slide further with respect to the limiting projections 34C of the second detent plate 34, the second detent plate 34 and the first detent plate 30 are moved toward the right side by the urging force of the clutch spring 32 (see FIG. 8A). When the rotor cam 38 is then rotated further in the other direction B so as to be rotated to the reference rotation position (when the operation detection device 48 has detected the rotor cam 38 has rotated to the reference rotation position), the reverse driving of the motor 40 is stopped under the control of the control device 20, such that the rotor cam 38 is returned to the reference rotation position.

Figure 9B:
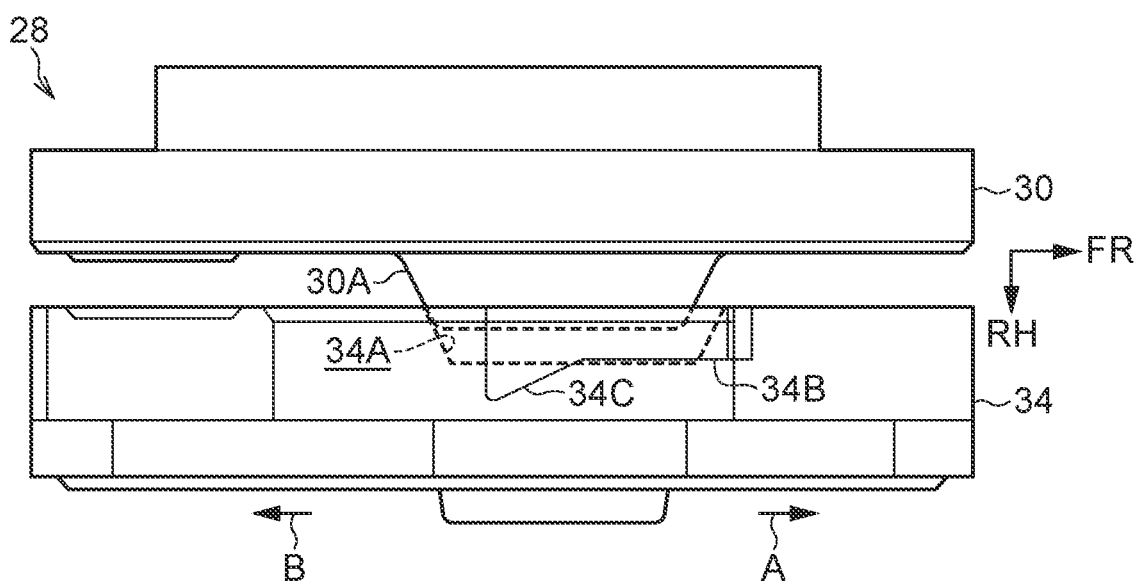
FIG. 9B is a plan view illustrating a state while connection of the lever to the operating mechanism by the clutch mechanism of the shift device according to the exemplary embodiment of the present invention is being released, as viewed from the upper side.
Figure 9C:
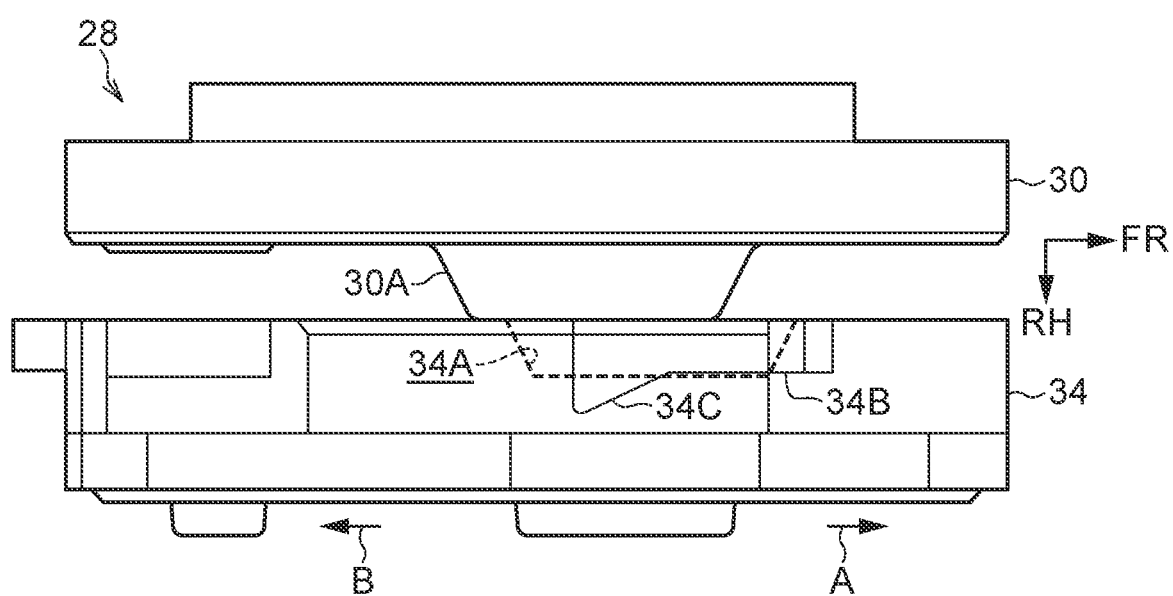
FIG. 9C is a plan view illustrating a state when connection of the lever to the operating mechanism by the clutch mechanism of the shift device according to the exemplary embodiment of the present invention has been released, as viewed from the upper side.

As described previously, when the operating mechanism 36 is operated in the forward direction and the lever 14 is pivoted toward the front side, rotation of the rotor cam 38 (worm wheel 38D) in the other direction B is restricted by the worm gear 46, such that rotation of the second detent plate 34 in the other direction B is also restricted. Thus, in this situation, in a case in which an external force of a predetermined load or greater toward the rear side acts on the lever 14 so as to impede pivoting of the lever 14 toward the front side, the projections 30A of the first detent plate 30 of the clutch mechanism 28 are moved in the other direction B out of the recesses 34A in the second detent plate 34 against the urging force of the clutch spring 32 (the connection of the lever 14 to the rotor cam 38 by the clutch mechanism 28 is released). Thus, the first detent plate 30 is permitted to rotate in the other direction B with respect to the second detent plate 34 (divergent rotation), and the lever 14 is permitted to pivot toward the rear side (see FIG. 9B and FIG. 9C). This enables external force toward the rear side acting on the lever 14 to be suppressed from being transmitted to the second detent plate 34, thereby suppressing damage to the operating mechanism 36.

Furthermore, when the operating mechanism 36 is being operated in the forward direction so as to pivot the lever 14 toward the front side, in a case in which a rotation position of the rotor cam 38 as detected by the operation detection device 48 (a rotation position of the second detent plate 34; an envisaged pivot position of the lever 14 by the rotor cam 38) exceeds a pivot position of the lever 14 (a rotation position of the first detent plate 30) as detected by the shift detection device 18 by a predetermined value in the one direction A, the control device 20 determines that the projections 30A of the first detent plate 30 have moved out of the recesses 34A in the second detent plate 34. The operating mechanism 36 is thereby operated in the reverse direction under the control of the control device 20, such that the second detent plate 34 is rotated in the other direction B. Note that the predetermined value is set to a rotation angle (such as 1°) in the one direction A of the second detent plate 34 with respect to the first detent plate 30 corresponding to a point directly before the projections 30A of the first detent plate 30 move out of the recesses 34A in the second detent plate 34.

Then, in a case in which the rotation position of the rotor cam 38 as detected by the operation detection device 48 no longer exceeds the pivot position of the lever 14 as detected by the shift detection device 18 by the predetermined value in the one direction A, the control device 20 determines the projections 30A of the first detent plate 30 have been reinserted into the recesses 34A in the second detent plate 34 (that the lever 14 and the rotor cam 38 have been connected by the clutch mechanism 28). The operating mechanism 36 is therefore operated in the forward direction under the control of the control device 20, such that the second detent plate 34 is rotated in the one direction A. Thus, the first detent plate 30 is rotated in the one direction A integrally to the second detent plate 34 rotating in the one direction A, such that the lever 14 is pivoted toward the front side.

Moreover, when the second detent plate 34 has been rotated in the one direction A in this manner, in a case in which the external force is still acting on the lever 14 so as to impede its pivoting toward the front side, the rotation position of the rotor cam 38 as detected by the operation detection device 48 again exceeds the pivot position of the lever 14 as detected by the shift detection device 18 by the predetermined value in the one direction A. Thus, similarly to as described previously, the second detent plate 34 is rotated in the other direction B, after which the second detent plate 34 is rotated in the one direction A.

Note that in the shift device 10 according to the present exemplary embodiment, the restraining mechanism 22 is provided separately to the clutch mechanism 28, and the restraining mechanism 22 urges the lever 14 toward a given shift position. This enables the restraining mechanism 22 to urge the lever 14 separately to the clutch mechanism 28, thereby enabling the degrees of freedom for setting the urging load on the lever 14 by the restraining mechanism 22 to be increased.

Moreover, when the operating mechanism 36 is operated in the forward direction to pivot the lever 14 toward the front side, the limiting projections 34C of the second detent plate 34 are fitted into the limiting recesses 38C in the rotor cam 38, such that rotation of the second detent plate 34 in the one direction A with respect to the rotor cam 38 is limited, and rotation of the first detent plate 30 in the one direction A and pivoting of the lever 14 toward the front side with respect to the rotor cam 38 are also limited. Thus, when the lever 14 is pivoted toward the front side and the roller 24A of the restraining body 24 of the restraining mechanism 22 is inserted into one of the restraining recesses 22A in the plate 12, this pivoting of the lever 14 toward the front side by the urging force of the restraining spring 26 can be limited, thereby enabling an increase in the pivot speed of the lever 14 toward the front side to be limited. This enables a change in the pivot speed of the lever 14 toward the front side to be suppressed, thereby enabling the pivot-operation of the lever 14 to have a favorable appearance, and also enabling noise generated when the roller 24A is inserted into one of the restraining recesses 22A to be suppressed, thereby enabling the operating noise of the lever 14 to be reduced.

Furthermore, the roller 24A of the restraining mechanism 22 is rotated and inserted into or moved out of one of the restraining recesses 22A to pivot the lever 14. This enables the lever 14 to pivot smoothly. Moreover, even though the roller 24A enables smooth pivoting of the lever 14, when the operating mechanism 36 is operated in the forward direction such that the lever 14 is pivoted toward the front side as described previously, this pivoting of the lever 14 toward the front side by the urging force of the restraining spring 26 can be limited.

Moreover, when the operating mechanism 36 is operated in the forward direction so as to pivot the lever 14 toward the front side as described previously, if the control device 20 determines that the projections 30A of the first detent plate 30 have moved out of the recesses 34A in the second detent plate 34 based on the operation detection device 48 and the shift detection device 18, the operating mechanism 36 is operated in the reverse direction. If the control device 20 then determines that the projections 30A of the first detent plate 30 have been reinserted into the recesses 34A in the second detent plate 34 based on the operation detection device 48 and the shift detection device 18, the operating mechanism 36 is operated in the forward direction. Thus, even in a case in which pivoting of the lever 14 toward the front side by operation of the operating mechanism 36 in the forward direction is impeded, such that the projections 30A of the first detent plate 30 have moved out of the recesses 34A in the second detent plate 34, the operating mechanism 36 is operated in the reverse direction, so as to reinsert the projections 30A of the first detent plate 30 into the recesses 34A in the second detent plate 34 at an early stage. The operating mechanism 36 thereby enables pivoting of the lever 14 toward the front side to be resumed at an early stage.

Furthermore, when the control device 20 has determined that the projections 30A of the first detent plate 30 have been reinserted into the recesses 34A in the second detent plate 34 and the operating mechanism 36 has been operated in the forward direction, in a case in which the control device 20 then determines that the projections 30A of the first detent plate 30 have moved out of the recesses 34A in the second detent plate 34, the operating mechanism 36 is again operated in the reverse direction similarly to as described above. The projections 30A of the first detent plate 30 are thereby reinserted into the recesses 34A in the second detent plate 34, after which the operating mechanism 36 is operated in the forward direction. Thus, when the projections 30A of the first detent plate 30 have been reinserted into the recesses 34A in the second detent plate 34, even in a case in which pivoting of the lever 14 toward the front side is still impeded and the projections 30A of the first detent plate 30 have again moved out of the recesses 34A in the second detent plate 34, the projections 30A of the first detent plate 30 are reinserted into the recesses 34A in the second detent plate 34, thereby enabling the operating mechanism 36 to cause pivoting force toward the front side to act on the lever 14.

Moreover, the shift detection device 18 and the operation detection device 48 are utilized to detect whether the projections 30A of the first detent plate 30 have moved out of or have been inserted into the recesses 34A in the second detent plate 34. This eliminates the need to provide a separate device to detect whether the projections 30A of the first detent plate 30 have moved out or have been inserted into the recesses 34A in the second detent plate 34, thereby enabling the configuration to be simplified.

Figure 10A:
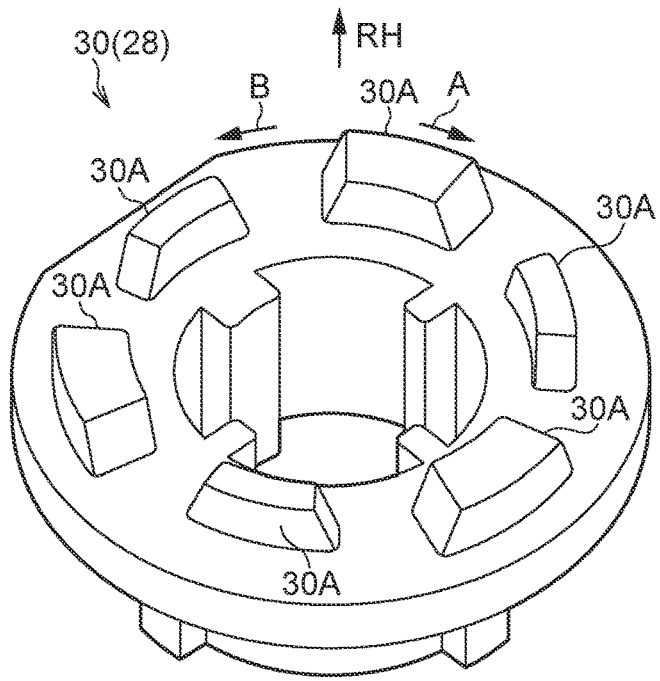
FIG. 10A is a perspective view illustrating a first detent plate of a modified example of the clutch mechanism of the shift device according to the exemplary embodiment of the present invention, as viewed from the right side.
Figure 10B:
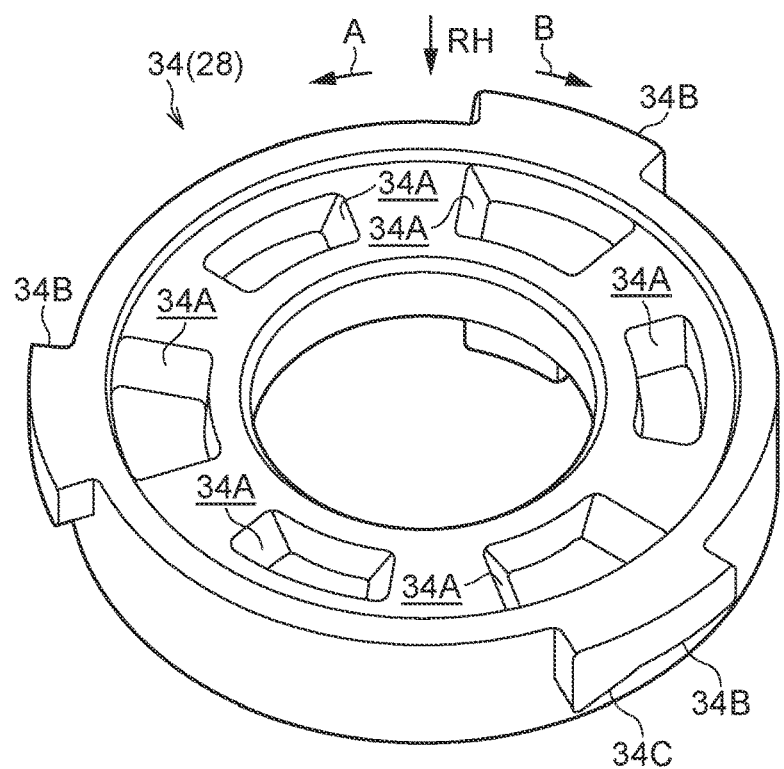
FIG. 10B is a perspective view illustrating a second detent plate of the modified example of the clutch mechanism of the shift device according to the exemplary embodiment of the present invention, as viewed from the left side.

Note that in the present exemplary embodiment, three projections 30A are provided to the first detent plate 30 and three recesses 34A are provided to the second detent plate 34. However, as illustrated in FIG. 10A and FIG. 10B, a configuration may be applied in which six projections 30A are provided to the first detent plate 30 and six recesses 34A are provided to the second detent plate 34. In such cases, in the first detent plate 30, projections 30A with a large width dimension (dimension in the first detent plate 30-radial direction) and projections 30A with a small width dimension are arranged alternately around the circumferential direction of the first detent plate 30. Similarly, in the second detent plate 34, recesses 34A with a large width dimension (dimension in the second detent plate 34-radial direction) and recesses 34A with a small width dimension are arranged alternately around the circumferential direction of the second detent plate 34. Thus, the large width dimension projections 30A of the first detent plate 30 cannot be inserted into the small width dimension recesses 34A in the second detent plate 34, whereas the large width dimension projections 30A and the small width dimension projections 30A of the first detent plate 30 can be respectively inserted into the large width dimension recesses 34A and the small width dimension recesses 34A in the second detent plate 34. This enables positional misalignment of the connecting tabs 34B of the second detent plate 34 in the first detent plate 30-circumferential direction with respect to the first detent plate 30 to be restricted, and also enables positional misalignment of the connecting tabs 34B in the lever 14-pivot direction with respect to the lever 14 to be restricted.

Moreover, in the present exemplary embodiment, the operating mechanism 36 causes the lever 14 to pivot to the "P" position. However, the operating mechanism 36 may cause the lever 14 to pivot to a shift position other than the "P" position, for example when the vehicle is driving autonomously.

Furthermore, in the present exemplary embodiment, the lever 14 (shift body) is pivoted. However, the shift body may be slid, or rotated about its center axis line.

Moreover, in the present exemplary embodiment, the shift device 10 is installed to the console. However, the shift device 10 may be installed to an instrument panel or a steering column.

What is claimed is:

1. A shift device comprising:
    a shift body that is moved to change a shift position;
    an urger configured to urge the shift body toward a shift position;
    an operator that is capable of being operated; and
    a connector including a first connecting section provided at a shift body side of the connector and a second connecting section provided at an operator side of the connector, and urging the shift body separately from the urger, the connector connecting the shift body to the operator upon operation of the operator such that the shift body is moved while the first connecting section and the second connecting section are moving as an integral unit and the urger is urging the shift body, and the first connecting section being moved to a rotation axis direction of the shift body from the second connecting section due to an external force acting on the shift body in a case in which the operator is being operated such that connection of the shift body to the operator is released.

2. The shift device of claim 1, wherein movement of the shift body by an urging force of the urger is limited in a case in which the operator is being operated.

3. The shift device of claim 1, further comprising a rotating section provided at the urger and configured to be rotated so as to move the shift body.

4. The shift device of claim 1, further comprising:
- a detector configured to detect connection of the shift body to the operator by the connector, and to detect a release of connection of the shift body to the operator by the connector; and
- a CPU that, after the detector has detected that connection of the shift body to the operator by the connector has been released when the CPU is configured to causes the operator to operate in a forward direction to move the shift body, is configured to causes the operator to operate in the forward direction in a case in which the detector has detected connection of the shift body to the operator by the connector when the CPU is configured to causellsll the operator to operate in a reverse direction.

5. The shift device of claim 4, wherein: in a case in which the detector has detected connection of the shift body to the operator by the connector so that the CPU has caused the operator to operate in the forward direction, the CPU has been configured to cause the operator to operate in the reverse direction in a case in which the detector subsequently detects that connection of the shift body to the operator by the connector has been released, and to cause the operator to operate in the forward direction in a case in which the detector subsequently detects connection of the shift body to the operator by the connector.

6. The shift device of claim 1, further comprising:
- a third connecting section provided at the connector so as to connect to the operator; and
- a limited section provided at the third connecting section such that the operator limits relative movement of the limited section.

7. The shift device of claim 1, further comprising a limiting section provided at the operator and configured to limit relative movement of the connector.

8. The shift device of claim 1, wherein the connector connects the shift body to the operator by an urging force, and connection of the shift body to the operator by the connector is released against the urging force.

9. The shift device of claim 1, wherein the first connecting section and the second connecting section are moved as an integral unit by an urging force, and the first connecting section and the second connecting section are moved relatively to one another against the urging force.

10. The shift device of claim 1, wherein action of the operator by an external force acting on the shift body is restricted mechanically in a case in which the connector connects the shift body to the operator such that the external force is not transmitted to the operator.

* * * * *